US012802151B2

(12) United States Patent
Song et al.

(10) Patent No.: US 12,802,151 B2
(45) Date of Patent: Nov. 17, 2026

(54) DEVICE, METHOD AND SYSTEM FOR USING MODIFIED TOKENS TO CONTROL COMMUNICATION DEVICE MOVEMENT

(71) Applicant: MOTOROLA SOLUTIONS, INC., Chicago, IL (US)

(72) Inventors: Chun Seng Song, George Town (MY); Woei Chyuan Tan, Bayan Lepas (MY); Kar Mun Tham, Simpang Ampat (MY); Kean Heng You, Bukit Mertajam (MY); Bernard Sin Peng Poh, George Town (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/958,969

(22) Filed: Nov. 25, 2024

(65) Prior Publication Data

US 2026/0148326 A1 May 28, 2026

(51) Int. Cl.
*G06Q 90/00* (2006.01)
*H04W 4/021* (2018.01)

(52) U.S. Cl.
CPC .......... *G06Q 90/205* (2013.01); *H04W 4/021* (2013.01)

(58) Field of Classification Search
CPC .................................................... G06Q 90/205
See application file for complete search history.

(56) References Cited

U.S. PATENT DOCUMENTS 10,433,399 B2 10/2019 Den Hartog et al.
10,683,088 B2 6/2020 Erickson et al.
10,789,830 B2 9/2020 Lisaj et al.
10,904,704 B2 1/2021 Benrachi et al.
11,417,106 B1 * 8/2022 Alzahrani ................. G06T 7/20
2004/0153334 A1 * 8/2004 Dione ................. G08B 25/014
705/323

(Continued)

FOREIGN PATENT DOCUMENTS

WO 2018169546 A1 9/2018

OTHER PUBLICATIONS

Mendes, Daniel Sousa. Building Evacuation Assistance System. MS thesis. Universidade do Porto (Portugal), 2022. (Year: 2022).*

*Primary Examiner* — Emmett K. Walsh
(74) *Attorney, Agent, or Firm* — PERRY + CURRIER INC. (FOR MSI)

(57) ABSTRACT

A computing device: transmits, to subsets of a plurality of communication devices at a given location, respective electronic tokens that indicate respective routes from the given location to one or more respective geographic locations; and receives at least a portion of the respective tokens, wherein receipt of a token indicates that a respective communication device has arrived at a respective geographic location. Based on respective numbers of the respective tokens that are received, the computing device: modifies the respective tokens for one or more portions of the plurality of communication devices from which a respective token has not yet been received; and transmits, to the one or more portions of the plurality of communication devices from which a respective token has not yet been received, respective modified tokens, the respective modified tokens indicating one or more respective updated routes from the given location to the one or more geographic locations.

16 Claims, 7 Drawing Sheets

(56) References Cited

U.S. PATENT DOCUMENTS

| | | | | |
|---|---|---|---|---|
| 2017/0024839 | A1* | 1/2017 | Klein .................... | G06Q 90/205 |
| 2019/0392224 | A1 | 12/2019 | Kruglick | |
| 2022/0005142 | A1* | 1/2022 | Mrozek ................ | G06Q 90/205 |
| 2022/0254161 | A1 | 8/2022 | Tatrai | |

* cited by examiner

DEVICE, METHOD AND SYSTEM FOR USING MODIFIED TOKENS TO CONTROL COMMUNICATION DEVICE MOVEMENT

BACKGROUND OF THE INVENTION

Electronic management of evacuations of crowded spaces is often performed using video analytics, for example to determine how many people are in a space being evacuated and/or left in the space being evacuated. However use of video analytics generally assumes that cameras are installed in a space being evacuated and, even if such cameras are present, once a person has left the space, there is no way to assess the evacuation using the cameras.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
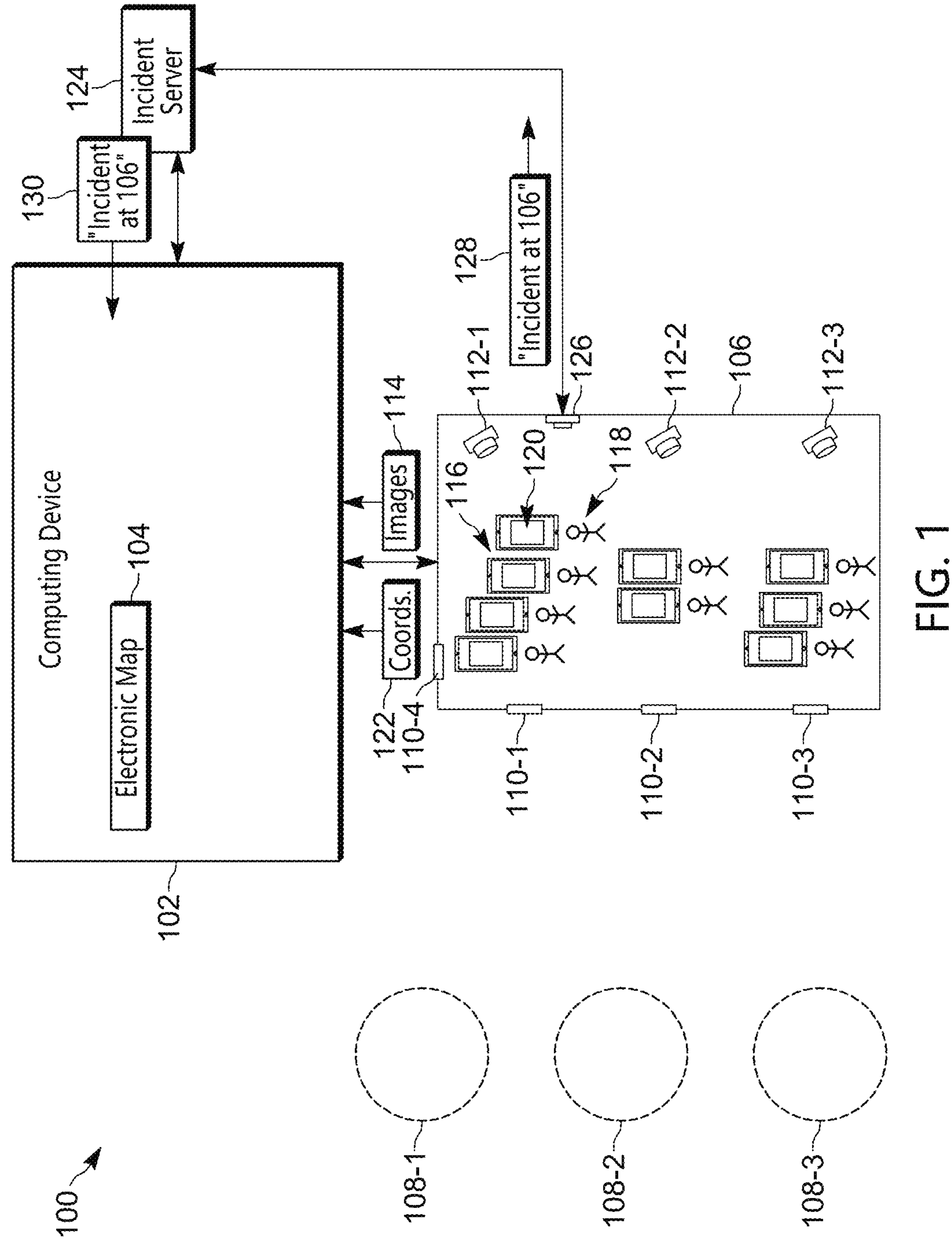
FIG. 1 is a system for using modified tokens to control communication device movement, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Video analytics via cameras installed in a space being evacuated may be used to monitor crowd behavior and/or assist personnel in controlling crowd flow during the evacuation of the space. However, video analytics using cameras installed in a space being evacuated may not fully enable an evacuation, as, once a person has left the space, there is no way to electronically determine using such video analytics whether they have safely arrived at a muster point, and the like, and/or to adjust the evacuation.

Thus, there exists a need for an improved technical method, device, and system for using modified tokens to control communication device movement.

For example, rather than track crowd movement in an evacuation of a given location using video analytics, tokens that indicate respective routes from the given location being evacuated to one or more respective geographic locations (e.g., muster points) are provided from a computing device to communication devices at the given location that are, for example, carried by persons at the given location.

When a communication device reaches a respective geographic location, the communication device may provide a previously received token back to the computing device, which generally enables the computing device to track effectiveness of an evacuation plan represented by the respective routes and the respective geographic locations. Furthermore, the computing device may unlock and/or open egress points, such as doors, along the respective routes. Based on numbers of the tokens received at the computing device, and the like, tokens for communications devices that have not arrived at the respective geographic locations, and/or which remain in the given location being evacuated, may be modified and again provided to such communication devices. The modified tokens may indicate one or more respective updated routes from the given location to the one or more respective geographic locations. Furthermore, the computing device may unlock and/or open egress points along the respective updated routes, which may generally result in more egress points being unlocked and/or opened.

An aspect of the present specification provides a method comprising: transmitting, from a computing device, to subsets of a plurality of communication devices at a given location, respective electronic tokens that indicate respective routes from the given location to one or more respective geographic locations; receiving, at the computing device, at least a portion of the respective electronic tokens, wherein receipt of an electronic token indicates that a respective communication device has arrived at a respective geographic location; based on respective numbers of the respective electronic tokens that are received, modifying the respective electronic tokens for one or more portions of the plurality of communication devices from which a respective electronic token has not yet been received; and transmitting, from the computing device, to the one or more portions of the plurality of communication devices from which a respective electronic token has not yet been received, respective modified electronic tokens, the respective modified electronic tokens indicating one or more respective updated routes from the given location to the one or more respective geographic locations.

Another aspect of the present specification provides a computing device comprising: a controller communicatively coupled to one or more of a microphone and a camera; and a computer-readable storage medium having stored thereon program instructions that, when executed by the controller, causes the controller to perform a set of operations comprising: transmitting, to subsets of a plurality of communication devices at a given location, respective electronic tokens that indicate respective routes from the given location to one or more respective geographic locations; receiving at least a portion of the respective electronic tokens, wherein receipt of an electronic token indicates that a respective communication device has arrived at a respective geographic location; based on respective numbers of the respective electronic tokens that are received, modifying the respective electronic tokens for one or more portions of the plurality of communication devices from which a respective electronic token has not yet been received; and transmitting, to the one or more portions of the plurality of communication devices from which a respective electronic token has not yet been received, respective modified electronic tokens, the respective modified electronic tokens indicating one or more respective updated routes from the given location to the one or more respective geographic locations.

Each of the above-mentioned embodiments will be discussed in more detail below, starting with example system and device architectures of the system in which the embodiments may be practiced, followed by an illustration of processing blocks for achieving an improved technical method, device, and system for using modified tokens to control communication device movement.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions and/or program code and/or computer program code. These computer program instructions and/or program code may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions and/or program code may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions and/or program code may also be loaded onto a computer or other programmable data processing apparatus that may be on or off-location, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for using modified tokens to control communication device movement. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

Furthermore, herein the term "token" may be used to indicate a set of data that may be provided to communication devices to indicate particular routes, and which may be particular to a communication device, and/or a set, and/or a subset, of communication devices. Indeed, in one example herein, subsets of communication devices may be provided with respective tokens that may be particular to the subsets but not the particular communication devices in the subset, to save overall processing power in tracking the respective tokens (e.g., to track the subset, but not the individual communication devices of the subset).

The system 100 comprises a computing device 102, which, as depicted, stores an electronic map 104 of a given location 106 (hereinafter interchangeably referred to as the location 106 for simplicity), and various geographic locations 108-1, 108-2, 108-3, which may be used as muster points during an evacuation of the location 106. For simplicity, the geographic locations 108-1, 108-2, 108-3 are interchangeably referred to hereafter, collectively, as the geographic locations 108 and, generically, as a geographic location 108. This convention will be used elsewhere in the present specification. The electronic map 104 may have any suitable format that may enable the computing device 102 to determine one or more respective evacuation routes from the given location 106 to the one or more respective geographic locations 108, as described herein, and/or to determine received location coordinates relative to egress points of the given location 106 as described herein.

The location 106 may comprise any suitable location that may be monitored, at least partially, using the computing device 102, including, but not limited to, a hotel, a mall a school, a restaurant, an arena, a convention center, a museum, an office building, amongst other possibilities. While FIG. 1 depicts only one room and/or space of the location 106, it is understood that the location 106 may comprise any suitable number of rooms and/or spaces, which may depend on an overall size of the location 106.

It is understood that the location 106 and the computing device 102 may be associated with an entity that manages the location 106, and/or assists at managing the location 106, such as a business, and the like, however such management of the location 106 and the computing device 102 may occur in partnership with a public-safety entity, which may include, but is not limited to a police entity and/or a private security company, and the like.

As depicted, the location 106 includes various electronic egress points 110-1, 110-2, 110-3, 110-4 (e.g., egress points 110 and/or an egress point 110). Such egress points 110 may comprise doors, and the like, that may be electronically locked and unlocked, and/or electronically opened and closed by the computing device 102. Hence it is understood that the computing device 102 may be communicatively coupled to the egress points 110 via respective communication links (not depicted). While four egress points 110 are depicted, the location 106 may include any suitable number of egress points 110, including as few as one egress point 110, and as many as ten egress points 110, twenty egress points 110, and higher, and/or any suitable number of egress points 110. Indeed, the number of egress points 110 may depend on a size of the location 106 and/or the depicted room and/or space. Furthermore, while doors are described as one example herein, the egress points 110 may include any suitable type of egress point, including, but not limited to, gates, windows, and the like.

Furthermore, one or more of the egress points 110 may not be controlled by the computing device 102 and may, for example, comprise doors that may be opened from the inside of the location 106 to exit the location. Indeed, in general, whether opened and/or unlocked by the computing device 102, and/or opened and/or unlocked by someone inside the location 106, the egress points 110 are understood to provide egress from inside the location 106 to outside the location 106, such that someone inside the location 106 may exit the location 106 to travel (e.g., walk) to one of the geographic locations 108 during an evacuation of the location 106, for example using an evacuation route determined by the computing device 102.

It is further understood that the electronic map 104 may further indicate positions of the egress points 110 at the location 106.

As depicted, the location 106 further comprises various cameras 112-1, 112-2, 112-3 (e.g., cameras 112 and/or a camera 112), which may be optional. In general, the cameras 112 may be optionally providing respective images 114 of their respective fields-of-view to the computing device 102 for analysis.

While for simplicity no communication links are specifically shown between the computing device 102 and specific components of the location 106, such as the egress points 110 and the cameras 112, one communication link is shown between the computing device 102 and the location 106 which represents various communication links between the computing device 102 and the components of the location 106, as well as between the computing device 102 and various communication devices 116 located inside the location 106.

For example, as depicted, a plurality of communication devices 116 are located inside the location 106, and are understood to be carried by respective persons 118. Furthermore, the communication devices 116 are understood to have an application 120 installed therein that may facilitate communication with the computing device 102. As depicted, the application 120 is indicated at one display screen of one communication device 116, but is understood to be installed at all the communication devices 116. In some examples, the applications 120 may be installed at the communication devices 116 prior to the persons 118 arriving at the location 106, while in other examples the persons 118 may be instructed (e.g., by a manager of the location 106) to install the application 120 at their respective communication devices 116 for use in the event of an evacuation of the location 106. Alternatively, or in addition, a person 118 may register an email address, a phone number, and the like, with the computing device 102 (and/or any other computing device associated with an entity managing the location 106), and receive, in response, a message in any suitable format that provides a link for installing the application 120. Indeed, the persons 118 may be at the location 106 for an event, such as a wedding, a political event, a concert, a sporting event, and the like, and attendance at the event, and/or entry into the location 106, may require installation of the application 120, at least temporarily, at attendees' respective communication devices 116.

It is furthermore understood that the communication devices 116 may comprise respective location determining devices, such as Global Positioning System (GPS) devices, which may be used by the communication devices 116 to determine their respective location coordinates 122 and report their respective location coordinates 122 to the computing device 102. In particular, the respective location coordinates 122 may indicate a position of respective communication devices 116 within the location 106. To save bandwidth, the respective location coordinates 122 may be periodically transmitted to the computing device 102, for example via the applications 120, but at a rate that is lower than a rate at which the location determining devices determine the location coordinates 122; for example, an application 120 installed at a communication device 116 may transmit respective location coordinates 122 to the computing device 102 at a rate of once per thirty second, once per minute, once per two minutes, amongst other possibilities.

As depicted, the persons 118 and their respective communication devices 116 are distributed throughout the location 106 and the cameras 112, while optional, are positioned to capture respective images 114 of various areas of the location 106. The images 114 may generally enable the computing device 102 to determine one or more of crowd size and crowd density of the persons 118, and/or a general distribution of the persons 118 in the location 106.

The images 114 may further enable the computing device 102 to determine location coordinates of the persons 118, and/or respective communication devices 116, relative to the egress points 110. For example, the persons 118 may register their faces with the computing device 102, as well as their associated communication devices 116, for example in association with installing the applications 120. In particular, in these examples, the controller 218, and/or the computing device 102 may compare faces in the images 114 with registered faces to determine location coordinates of associated persons 118 and hence location coordinates of their communication devices 116 within the location 106 relative to the egress points 110, for example, by locating locations of the communication devices 116 on the electronic map 104.

Alternatively, or in addition, the coordinates 122 may generally enable the computing device 102 to determine one or more of crowd size and crowd density of the persons 118, and/or a general distribution of the persons 118 in the location 106, The coordinates 122 may further enable the computing device 102 to determine positions of the persons 118, and/or respective communication devices 116, relative to the egress points 110, for example, by locating the coordinates 122 on the electronic map 104.

Also depicted in FIG. 1 is an optional incident server 124, communicatively coupled to the computing device 102, and an optional button 126 in the location 106 communicatively coupled to the incident server 124. The optional button 126 may comprise an alarm button, and the like, that, when actuated (e.g., by a person 118) may indicate to the incident server 124 that an incident (e.g., a public-safety incident, such as a fire, an attack, and the like), is occurring at the location 106 and/or in proximity to the location 106. The incident server 124 may be a component of a public-safety answering point (PSAP) and/or a dispatch center, that may be generally enabled to answer 911 calls, dispatch public-safety personnel to incidents, and the like. As depicted, when the button 126 is actuated, an indication 128 of an incident occurring at the location 106 may be transmitted to the incident server 124 (e.g., as depicted "Incident at 106"), that may, for example, be received at an associated terminal operated by a 911 operator and/or a dispatcher (not depicted), who may initiate dispatch of public-safety personnel to the location 106 in response (e.g., and who may perform further analysis as to whether an incident is actually occurring before such a dispatch). The operator and/or dispatcher may initiate transmission of a respective indication 130 of an incident occurring in proximity to the given location 106 (e.g., as depicted "Incident at 106") to the computing device 102.

Alternatively, or in addition, the indication 130 may be transmitted to the computing device 102 automatically and/or without actuation of the button 126, for example when a call indicating an incident occurring in proximity to the given location 106 is received at the incident server 124 and/or an associated terminal, and the like.

Alternatively, or in addition, a person 118 may interact with a respective application 120 installed at a respective communication device 116 to indicate to the computing device 102, and/or the incident server 124, that an incident is occurring in proximity to the given location 106. In these examples, the indication 130 may be received at the computing device 102 from a communication device 116 and/or the incident server 124.

As is next described, the computing device 102 is generally configured to electronically manage evacuations of the location 106 using modified tokens to control communication device movement.

In particular, the computing device 102 may transmit, to subsets of the communication devices 116, respective electronic tokens that indicate respective routes from the given location 106 to one or more respective geographic locations 108. In particular, using the images 114 and/or the coordinates 122, the computing device 102 may divide the communication devices 116 into the subsets based on their respective locations within the location 106 relative to the egress points 110 and determine respective evacuation routes to the geographic locations 108 accordingly. For example, a first subset of the communication devices 116 in proximity to the first egress point 110-1 may receive respective tokens indicating an evacuation route to the first geographic location 108-1 through the first egress point 110-1, a second subset of the communication devices 116 in proximity to the second egress point 110-2 may receive respective tokens indicating an evacuation route to the second geographic location 108-2 through the second egress point 110-2, and a third subset of the communication devices 116 in proximity to the third egress point 110-3 may receive respective tokens indicating an evacuation route to the third geographic location 108-3 through the third egress point 110-3.

Once a communication device 116 arrives at a geographic location 108 indicated by a respective token, the communication device 116 may transmit the respective token back to the computing device 102. For example, in FIG. 1 the geographic locations 108 are indicated in outline, indicating that they may not be specific buildings, or parks, or places, but rather may comprise geographic locations indicated by a set of geofence coordinates that may be provided in the tokens; indeed, in some examples, all the tokens may include geofence coordinates for all the geographic locations 108, even when a respective token indicates a route to a specific geographic location 108.

Hence, a communication device 116, using a respective location determining device, may determine when the communication device 116 has reached a geographic location 108 using such geofence coordinates and transmit a respective token back to the computing device 102, though the respective token may not be transmitted in the received format, but in any suitable format. Indeed, the respective token transmitted back to the computing device 102 may comprise an indication of the received token, but in a format that identifies the communication device 116 that transmitted the respective token, the arrival at the geographic location 108, and/or an indication of the evacuation route used to reach the geographic location 108. Indeed, the communication device 116 may track an evacuation route used to reach the geographic location 108 using a respective location determining device, and the respective token transmitted back to the computing device 102 may indicate the used evacuation route and/or how the used evacuation route differs from the evacuation route received in the original token.

However, in a simplest example, when a communication device 116 that has received a token reaches a geographic location 108, as determined by the computing device 102 comparing a current location to geofence coordinates of a geographic location 108 received in the token, the communication device 116 may merely transmit the token, as received, back to the computing device 102. This simplest example may further exclude the communication device 116 transmitting respective location coordinates 122 to the computing device 102 once the communication device 116 has left the location 106. Indeed, this simplest example may save and/or processing resources bandwidth in the system 100 in an evacuation. For example, during evacuations, many communication devices may attempt to communicate all at once, which may overwhelm a network and/or networks serving the area around the evacuation, which may cause the network and/or networks to be congested and/or overloaded, which may lead to dropped calls, failed call attempts, delayed messaging, data slowdowns, and the like, for first responder communication devices. Hence, by utilizing the tokens to track an evacuation, and not location coordinates of communication devices carried by persons being evacuated, a significant reduction in in network usage may be achieved.

Returning to the example, the computing device 102 receives at least a portion of the respective electronic tokens back from communication devices 116 that have reached the geographic locations 108, and receipt of an electronic token hence indicates that a respective communication device 116 has arrived at a respective geographic location 108.

Based on respective numbers of the respective electronic tokens that are received at the computing device 102, the computing device 102 modifies the respective electronic tokens for one or more portions of the plurality of communication devices 116 from which a respective electronic token has not yet been received.

Put another way, based on the respective numbers of the respective electronic tokens that are received at the computing device 102, as well other possibilities (e.g., how a used evacuation route differs from an evacuation route provided in an original token), the computing device 102 may modify an evacuation route to better manage the evacuation.

In one specific example, when a number of first communication devices 116 that arrive at the first geographic location 108 is below a threshold number (e.g., which may be 10%, 20%, 30%, amongst other possibilities, of the original number of first communication devices 116 in the first subset), the computing device 102 may update the evacuation route for at least a portion of the communication devices 116 in the first subset. For example, the updated evacuation route for the first subset of communication devices 116 may be through the fourth egress point 110-4 rather than the first egress point 110-1.

Furthermore, the computing device 102 transmits, to the one or more portions of the plurality of communication devices 116 from which a respective electronic token has not yet been received, respective modified electronic tokens that indicate one or more respective updated routes from the given location 106 to the one or more respective geographic locations 108.

Returning to the specific example, one or more portions of the plurality of communication devices 116 of the first subset from which a token has not yet been received, including, but not limited to communication devices 116 that remain in the location 106, may receive modified electronic tokens that indicate an updated evacuation route to the first geographic location 108-1 via the fourth egress point 110-4.

However, the modified electronic tokens may indicate updated evacuation routes to a different geographic location 108 than indicated by the original tokens, and/or may use different egress points 110 than indicated by the original tokens, and/or may be between the originally indicated geographic location 108 and egress point 110, but with a different route therebetween (e.g., which may be based on the aforementioned differences between a used evacuation route differs and an evacuation route indicated in an original token).

Furthermore, when the egress points 110 are controlled by the computing device 102, the computing device 102 may open and/or unlock egress points 110 along any determined evacuation route.

In this manner, the computing device 102 may manage an evacuation using modified tokens to control communication device movement (e.g., rather than strictly manage movement by the persons 118 using video analytics and/or by tracking location coordinates of the individual communication devices 116).

Figure 2:
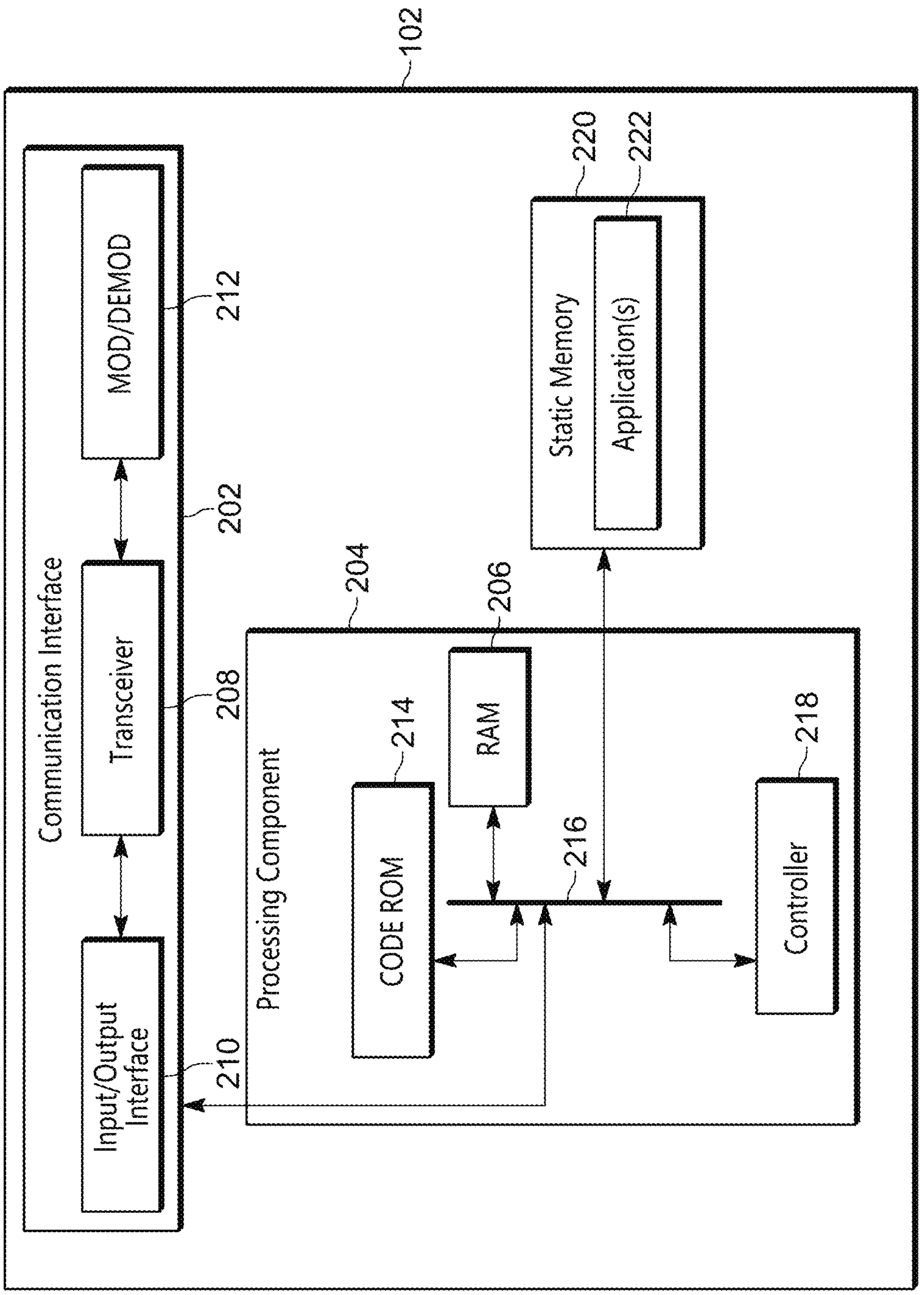
FIG. 2 is a device diagram showing a device structure of a device for using modified tokens to control communication device movement, in accordance with some examples.

Attention is next directed to FIG. 2, which depicts a schematic block diagram of an example of the computing device 102.

While the computing device 102 is depicted in FIG. 2 as a single component, the computing device 102 may be distributed among a plurality of components and the like including, but not limited to, any suitable combination of one or more servers, one or more cloud computing devices, and the like. In some examples, the computing device 102 and the incident server 124 may be combined and/or partially combined.

As depicted, the computing device 102 comprises: a communication interface 202, a processing component 204, a Random-Access Memory (RAM) 206, one or more wireless transceivers 208 (which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222.

While not depicted, the computing device 102 may include one or more of an input device and a display screen and the like.

As shown in FIG. 2, the computing device 102 includes the communication interface 202 communicatively coupled to the common data and address bus 216 of the processing component 204.

The processing component 204 may include the code Read Only Memory (ROM) 214 coupled to the common data and address bus 216 for storing data for initializing system components. The processing component 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100, such as the egress points 110, the cameras 112, and the communication devices 116.

For example, the communication interface 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3$^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network.

Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

However, at least a digital mobile radio (DMR) network, a Project 25 (P25) network, a terrestrial trunked radio (TETRA) network and any corresponding DMR transceiver, P25 transceiver, and TETRA transceiver may be dedicated for use by first responder radios and/or any other first responder communication devices, and a portion of the communication devices 116 may comprise such first responder radios and/or communication devices (e.g., some of the persons 118 may be first responders).

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and one or more TPUs (Tensor Processing Units), and the like, and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for using modified tokens to control communication device movement. For example, in some examples, the computing device 102 and/or the controller 218 specifically comprises a computer executable engine configured to implement functionality for using modified tokens to control communication device movement.

The static memory 220 comprises a non-transitory machine readable medium that stores machine readable instructions to implement one or more programs or applications and/or program code. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

Figure 3:
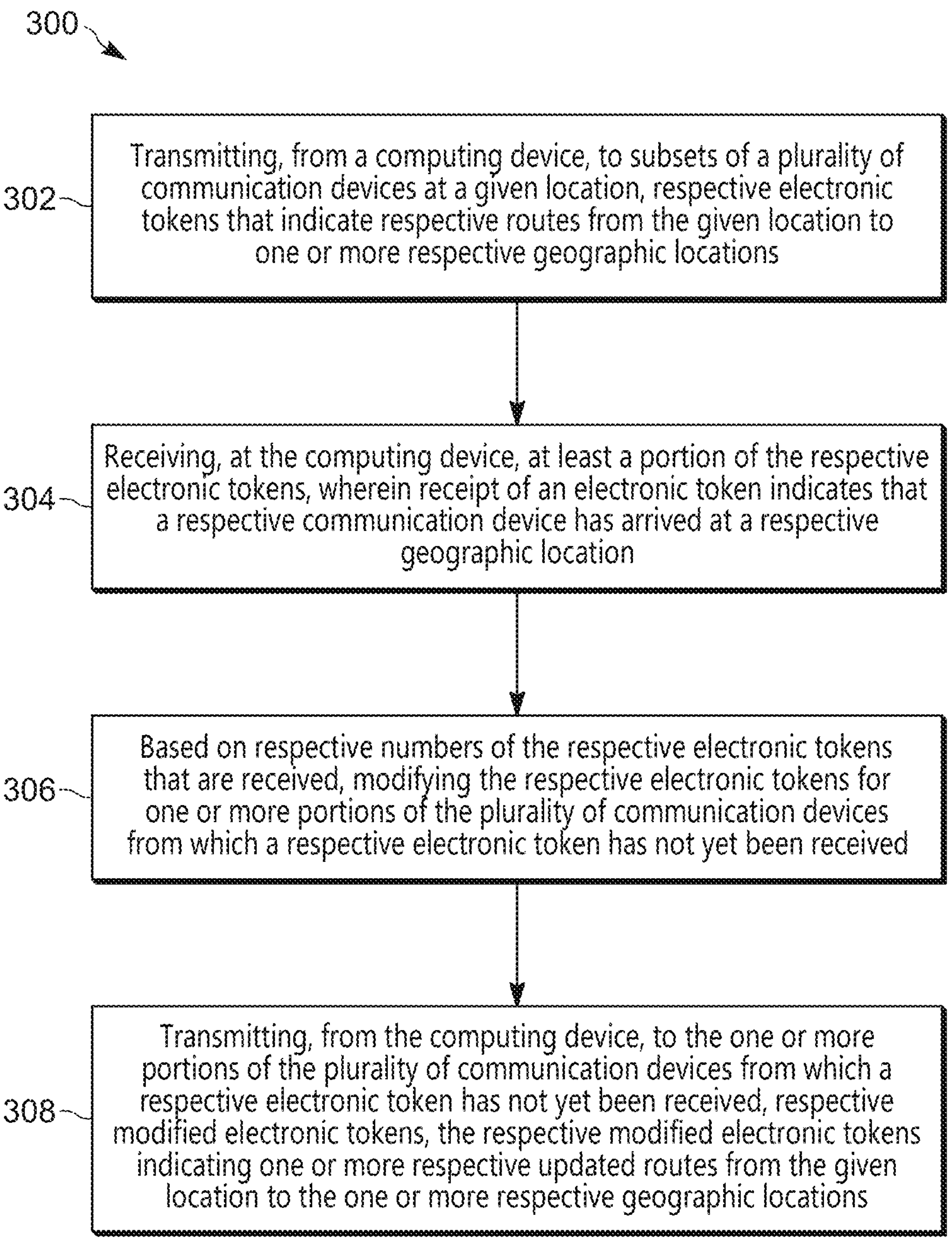
FIG. 3 is a flowchart of a method for using modified tokens to control communication device movement, in accordance with some examples.

In particular, the memory 220 stores instructions and/or program code corresponding to the at least one application 222 that, when executed by the controller 218, enables the controller 218 to implement functionality for using modified tokens to control communication device movement, including but not limited to, the blocks of the methods set forth in FIG. 3.

The application 222 may include programmatic algorithms, and the like, to implement functionality as described herein.

Alternatively, and/or in addition to programmatic algorithms, the application 222 may include one or more machine learning algorithms to implement functionality as described herein.

The one or more machine learning algorithms of the application 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

When one or more machine learning algorithm are used to implement functionality as described herein, the one or more machine learning algorithm may be trained to divide communication devices into groups based on respective location coordinates and/or determine respective evacuation routes (including, but not limited to, updated evacuation routes), for example, by appropriate (positive and/or negative) training data that may be manually generated, or generated by a training data generation computing device.

For example, positive training data for dividing communication devices into subsets based on respective location coordinates may include positive training input comprising location coordinates of communication devices in the location 106 (or a similar location), and positive training output may comprise subsets of the communication devices and/or their respective location devices. Such subsets may be manually determined, or may be determined using a programmatic algorithm, and the like. Furthermore, it is understood that the location coordinates may be for training purposed only, and associated communication devices may not actually be located at the location 106.

Similarly, negative training data for dividing communication devices into subsets based on respective location coordinates may include negative training input comprising location coordinates of communication devices in the location 106 (or a similar location), and negative training output may comprise incorrect subsets of the communication devices and/or their respective location devices. Such incorrect subsets may be manually determined, or may be determined using a programmatic algorithm, and the like.

Similarly, positive training data for determining evacuation routes may include location coordinates of subsets of the communication devices in the location 106 (or a similar location), locations of egress points 110 (and the like), and locations of the geographic locations 108 (and the like), and positive training output may comprise respective routes between the location 106 and the geographic locations 108, that may be manually determined, or may be determined using a programmatic algorithm, and the like. Such respective routes may be most direct routes between the location 106 and the geographic locations 108, and the like, via specific egress points 110, but may avoid certain landmarks, and/or streets etc., and/or may be selected to avoid intersecting with other routes.

Similarly, negative training data for determining evacuation routes may include location coordinates of subsets of the communication devices in the location 106 (or a similar location), locations of egress points 110 (and the like), and locations of the geographic locations 108 (and the like), and negative training output may comprise incorrect respective routes between the location 106 and the geographic locations 108, that may be manually determined, or may be determined using a programmatic algorithm, and the like. Such incorrect routes may be indirect direct routes between the location 106 and the geographic locations 108, and the like, and may include detours to certain landmarks, and/or streets etc., and/or may be selected to intersect with other routes.

It is furthermore, understood that positive training data for determining updated evacuation routes may include location coordinates of subsets of the communication devices in the location 106 (or a similar location), locations of egress points 110 (and the like), and locations of the geographic locations 108 (and the like), as well as a previous route that needs to be updated, and/or an actual route that was used between the location 106 and a geographic location 108. Positive training output may comprise respective updated routes between the location 106 and the geographic locations 108, via specific egress points 110, that differ from a previous route and/or that are similar to an actual route, that may be manually determined, or may be determined using a programmatic algorithm, and the like. Such respective updated routes may be to a different geographic location 108 than a previous route, and/or may be via different egress points 110 than a previous route, and/or may be between the originally indicated geographic location 108 and egress point 110, but with a different route therebetween.

It is furthermore, understood that negative training data for determining updated evacuation routes may include location coordinates of subsets of the communication devices in the location 106 (or a similar location), locations of egress points 110 (and the like), and locations of the geographic locations 108 (and the like), as well as a previous route that needs to be updated, and/or an actual route that was used between the location 106 and a geographic location 108. Negative training output may comprise respective updated routes between the location 106 and the geographic locations 108 that are the same as a previous route and/or that are dissimilar to an actual route, amongst other possibilities, that may be manually determined, or may be determined using a programmatic algorithm, and the like.

It is further understood that the routes and/or updated routes may be based on may be further based on weather conditions and/or traffic conditions, amongst other possibilities, assuming the computing device 102 has access to such information (e.g., via a weather server, a traffic server, and the like, not depicted). In these examples, the training input (e.g., whether positive or negative), may include weather conditions and/or traffic conditions.

While details of other components of the system 100 are not depicted, such as the communication devices 116 and the incident server 124, the communication devices 116 and the incident server 124 may have a structure similar to that of the computing device 102, but adapted for respective functionality of the communication devices 116 and the incident server 124. For example, the communication devices 116 are understood to comprise a display screen and one or more input devices, in addition to the components depicted in FIG. 2, for example for interaction with the applications 120. Similarly, the incident server 124 is understood to comprise components for communicating with terminals, answering calls, communicating with first responder devices, and may include such terminals and related display screens, etc., in addition to the components depicted in FIG. 2.

Attention is now directed to FIG. 3, which depicts a flowchart representative of a method 300 for using modified tokens to control communication device movement. The operations of the method 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222. The method 300 of FIG. 3 is one way in which the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218, and/or the computing device 102, transmits, to subsets of a plurality of communication devices 116 at a given location 106, respective electronic tokens that indicate respective routes from the given location 106 to one or more respective geographic locations 108.

It is understood that, in some examples, the controller 218 and/or the computing device 102 may, in conjunction with the block 302, determine the respective routes from the given location 106 to one or more respective geographic locations 108 and the respective routes may comprise evacuation routes.

Alternatively, or in addition, the respective routes from the given location 106 to one or more respective geographic locations 108 may be predetermined and stored at a memory accessible to the computing device 102, such as the memory 220, amongst other possibilities (e.g., such as at a database (not depicted), and the like, external to the computing device 102).

It is furthermore understood that one or more of the respective routes may be determined using the electronic map 104 and/or using one or more machine learning algorithms, and the like.

At a block 304, the controller 218, and/or the computing device 102, receives at least a portion of the respective electronic tokens, and receipt of an electronic token indicates that a respective communication device 116 has arrived at a respective geographic location 108.

Based on respective numbers of the respective electronic tokens that are received, at a block 306, the controller 218, and/or the computing device 102, modifies the respective electronic tokens for one or more portions of the plurality of communication devices 116 from which a respective electronic token has not yet been received. For example, a modified electronic tokens may include an updated route and/or evacuation route.

In some examples, the controller 218, and/or the computing device 102, may wait for a given time period, such as five minutes, ten minutes, fifteen minutes, and the like, between implementing the blocks 304, 306 to allow time for persons 118 carrying the communication devices 116 to reach respective geographic locations 108. Such a given time period may be based on one or more estimated times to reach respective geographic locations 108. In particular, when the computing device 102 determines the respective routes, the computing device 102 may estimate time periods for a person to reach a respective geographic location 108 via the respective routes and select the given time period accordingly, though the given time period may represent a time period for a person to reach a respective geographic location 108 with, for example an additional percentage time added thereto, such as 5%, 10%, 15%, amongst other possibilities. In such examples, the aforementioned one or more machine learning algorithms may be adapted to estimate time periods for a person to reach a respective geographic location 108.

When a number of communication devices 116 that arrive at a respective geographic location 108 (e.g., after a given time period) is below a threshold number (e.g., which may be 10%, 20%, 30%, amongst other possibilities, of the original number of communication devices 116 in a respective subset), the computing device 102 may modify the respective electronic tokens for one or more portions of the plurality of communication devices 116 from which a respective electronic token has not yet been received. Furthermore, the threshold number may be provided in any suitable format including, but not limited to, a specific number, the aforementioned percentages, and the like.

At a block 308, the controller 218, and/or the computing device 102, transmits, to the one or more portions of the plurality of communication devices 116 from which a respective electronic token has not yet been received, respective modified electronic tokens, the respective modified electronic tokens indicating one or more respective updated routes from the given location 106 to the one or more respective geographic locations 108.

It is furthermore understood that one or more of the respective updated routes may be determined using the electronic map 104 and/or one or more machine learning algorithms.

Furthermore, in some examples, the respective modified electronic tokens may be transmitted to any respective communication devices 116 of the subsets from which a respective electronic token has not yet been received, including communication devices 116 that remain at the location 106 and communication devices 116 that have left the location 106 (but not yet reached a geographic location 108).

In other examples, the respective modified electronic tokens may be transmitted to respective communication devices 116 of the subsets from which a respective electronic token has not yet been received but that remain at the location 106, for example as indicated by such communication devices 116 continuing to provide their respective location coordinates 122 to the computing device 102, and/or that are indicated in the images 114. Such examples may exclude transmitting the respective modified electronic tokens to communication devices 116 that have left the location 106 (but not yet reached a geographic location 108), as indicated by such communication devices 116 no longer providing their respective location coordinates 122 to the computing device 102, and/or that are indicated by the images 114 as no longer being in the location 106.

The method 300 may include other features.

For example, the method 300 may further comprise the controller 218, and/or the computing device 102: unlocking one or more egress points 110 from the given location 106 to the one or more respective geographic locations 108 along the respective routes.

Alternatively, or in addition, the method 300 may further comprise the controller 218, and/or the computing device 102: unlocking one or more egress points 110 from the given location 106 to the one or more respective geographic locations 108 along the one or more respective updated routes.

For example, when one or more of the egress points 110 is locked, the controller 218, and/or the computing device 102 may unlock and/or open such egress points 110 when along the respective routes and/or the respective updated routes It is furthermore understood that at least one respective updated route of the respective updated routes is different from the respective routes.

Alternatively, or in addition, at least one geographic location 108 associated with the respective updated routes may be different from geographic locations 108 associated with the respective routes.

Alternatively, or in addition, at least one egress point 110 associated with the respective updated routes may be different from egress points 110 associated with the respective routes.

Alternatively, or in addition, the method 300 may further comprise the controller 218, and/or the computing device 102: one or more of receiving, from one or more cameras 112 located at the given location 106, images 114 of the given location 106; and receiving, from the plurality of communication devices 116, respective location coordinates 122 of the plurality of communication devices 116 within the given location 106; and dividing the plurality of communication devices 116 into the subsets based on one or more of the images 114 and the respective location coordinates 122.

Put another way, the controller 218, and/or the computing device 102 receives one or more of the images 114 and the location coordinates 122 and may divide the communication devices 116 into the subsets of the block 302 based on one or more of the images 114 and the location coordinates 122.

For example, when dividing the plurality of communication devices 116 into the subsets is based on the images 114, the computing device 102 may analyze the images 114 to determine proximity of associated persons 118 to the various egress points 110, however such an example may depend on the persons 118 registering their faces with the computing device 102, as well as their associated communication devices 116, for example in association with installing the applications 120. In particular, in these examples, the controller 218, and/or the computing device 102 may compare faces in the images 114 with registered faces to determine location coordinates of associated persons 118 and hence their communication devices 116, and divide the communication devices 116 into subsets accordingly, for example by locating the image-derived location coordinates on the electronic map 104.

However, when dividing the plurality of communication devices 116 into the subsets is based on the location coordinates 122, the computing device 102 may analyze the location coordinates 122 to determine proximity of the location coordinates 122 to the various egress points 110 using, for example, the electronic map 104 (e.g., the location coordinates 122 may be placed on the electronic map 104).

Regardless of whether the dividing the plurality of communication devices 116 into the subsets is based on the images 114 and/or the location coordinates 122, the dividing into subsets may be based on proximity of the communication devices 116 to the egress points 110. For example, the controller 218, and/or the computing device 102 may divide the plurality of communication devices 116 into about equal sized subsets (e.g., with respect to about a same number of the plurality of communication devices 116 in each subset) that are proximal to a respective egress points 110. In some examples, the controller 218, and/or the computing device 102 may divide the plurality of communication devices 116 into the same number of subsets as there are egress points 110. For example, based on the location 106 having four egress points 110, the controller 218, and/or the computing device 102 may divide the plurality of communication devices 116 into four subsets.

However, when two or more egress points 110 are adjacent to each other, such as the first egress point 110-1, and the fourth egress point 110-4, the controller 218, and/or the computing device 102 may choose the egress point 110-1, 110-4 that has the most direct route to a respective geographic location 108, such as the egress point 110-1, and ignore the egress point(s) 110 having the least direct route to a respective geographic location 108, and divide the plurality of communication devices 116 into the subsets accordingly. For example, the controller 218, and/or the computing device 102 may ignore the fourth egress point 110-4, and divide the plurality of communication devices 116 into three subsets, one for each of the egress points 110-1, 110-2, 110-3.

Alternatively, or in addition, the method 300 may further comprise the controller 218, and/or the computing device 102: receiving, from the incident server 124, the indication 130 of an incident occurring in proximity to the given location 106; and initiating transmission of the respective electronic tokens (e.g., at the block 302) in response to receiving the indication 130 of the incident.

Put another way, the method 300 may be initiated when receiving the indication 130.

Alternatively, or in addition, the method 300 may further comprise the controller 218, and/or the computing device 102: receiving, from one or more cameras 112 located at the given location 106, images 114 of the given location 106; analyzing the images 114 to determine one or more of a crowd size and a crowd density; and initiating transmission of the respective electronic tokens (e.g., at the block 302) when the crowd size reaches a threshold crowd size or when the crowd density reaches a threshold crowd density.

Alternatively, or in addition, the method 300 may further comprise the controller 218, and/or the computing device 102: receiving, from the plurality of communication devices 116, respective location coordinates 122; analyzing the respective location coordinates to determine one or more of a crowd size and a crowd density; and initiating transmission of the respective electronic tokens (e.g., at the block 302) when the crowd size reaches a threshold crowd size or when the crowd density reaches a threshold crowd density.

Put another way, the images 114 and/or the location coordinates 122 may be used to estimate crowd size (e.g., with respect to a number of the persons 118) and/or crowd density (e.g., number of persons per square meter, and the like), and the method 300 may be initiated when the crowd and/or crowd density reaches, respectively, a predetermined threshold crowd size and/or predetermine threshold crowd density, presuming some indication of an incident, such as the indication 130, has been received.

The predetermined threshold crowd size may be determined heuristically and may depend on a size of the location 106 and/or a maximum capacity thereof. For example, when the location 106 is associated with a maximum number of persons (e.g., a maximum capacity, which may be 50 persons, 100 persons, 1000 persons or higher, amongst other possibilities), the threshold crowd size may be 10%, 15%, 20%, of the maximum number of persons. Alternatively, or in addition, the threshold crowd size may be determined by an administrator of the system 100. The threshold crowd size may be stored at the memory 220, for example at the application 222.

The predetermined threshold crowd density may be determined heuristically by an administrator of the system 100 and stored at the memory 220, for example at the application 222. For example, the predetermined threshold crowd density may be two persons per square meter, three persons per square meter, five persons per square meter, amongst other possibilities.

In examples, where crowd size and/or crowd density is used to initiate the method 300, it is understood that when the crowd size is less than the threshold crowd size, and/or the crowd density is less than the threshold crowd density, an evacuation may still occur, but may be managed manually, and the like, as the crowd may be of a sufficient size and/or density for such a manually managed evacuation.

It is furthermore understood that the at least a portion of the respective electronic tokens may be received (e.g., at the block 304) from respective communication devices 116 arriving at the one or more respective geographic locations 108, for example using the aforementioned geofencing.

However, in other examples, one or more of the geographic locations 108 may include a respective check-in device, for example operated by a first responder located at a respective geographic location 108, and a person 118 arriving at a respective geographic location 108 may place their respective communication device 116 adjacent the check-in device to transfer a respective electronic token to the check-in device (e.g., using respective near-field communication (NFC) transceivers, respective radio frequency identification (RFID) transceivers, and the like, amongst other possibilities), that may, in turn, provide the respective electronic token to the computing device 102.

It is furthermore understood that the respective electronic tokens and the respective modified electronic tokens may be transmitted to the communication devices 116 (e.g., at the blocks 302, 308, respectively) via an application 120 installed at the communication devices 116. Put another way, while transmitting the respective electronic tokens and the respective modified electronic tokens the communication devices 116 may occur in any suitable manner, communication between the computing device 102 and the communication devices 116 for evacuations may occur via the applications 120. For example, when a token is received at a communication device 116, an evacuation route indicated by the token may be visually provided within a respective application 120.

Attention is next directed to FIG. 4, FIG. 5, FIG. 6, and FIG. 7, which depict an example of the method 300 being implemented in the system 100. FIG. 4, FIG. 5, FIG. 6, and FIG. 7 are similar to FIG. 1, with like components having like numbers.

Figure 4:
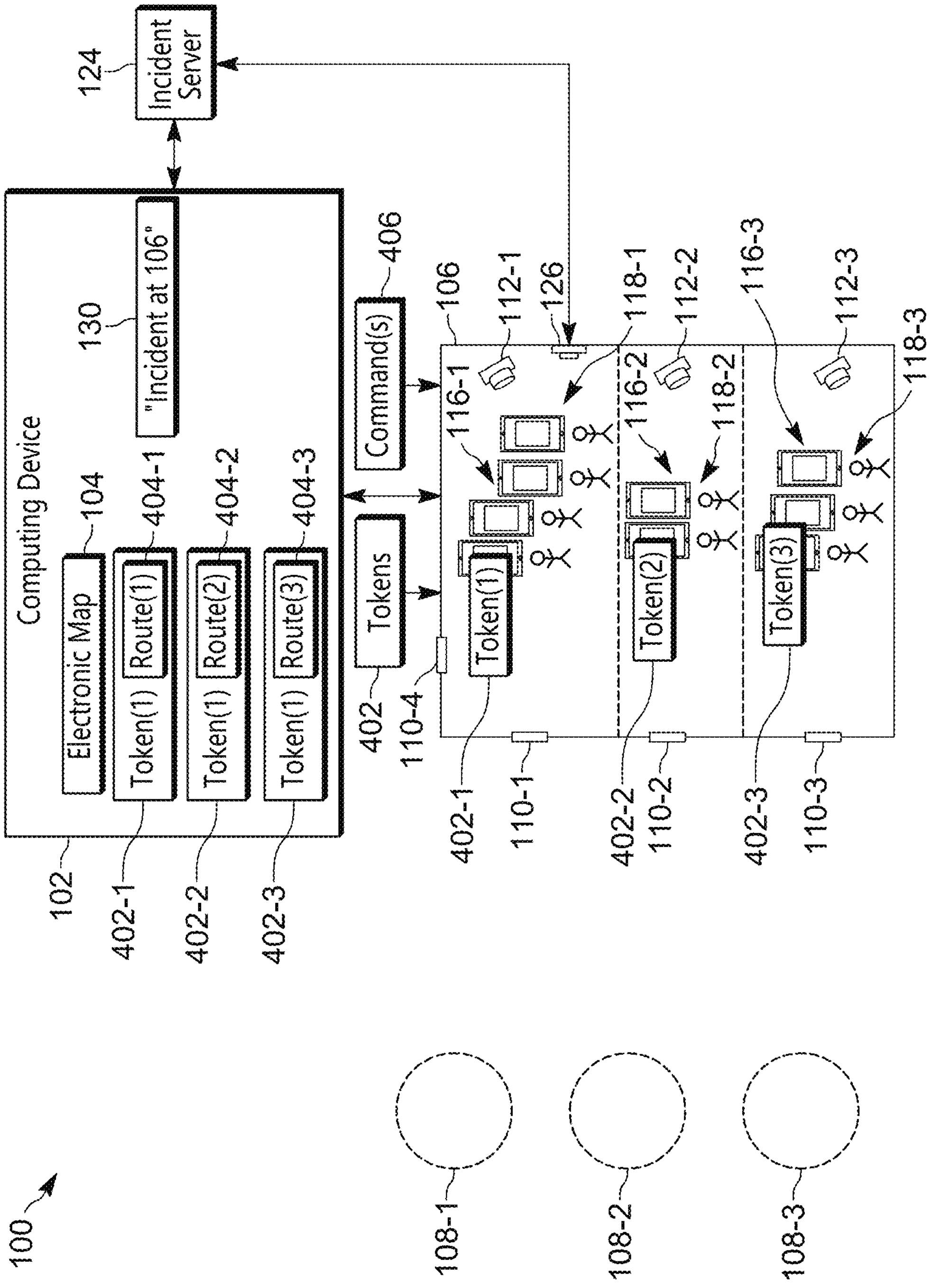
FIG. 4 depicts the system of FIG. 1 implementing a method for using modified tokens to control communication device movement, in accordance with some examples.

Attention is first directed to FIG. 4, which depicts the computing device 102 determining subsets of the plurality of communication devices 116. For example, as depicted, and based on the images 114 (not depicted for simplicity, but nonetheless understood to be present) and/or the location coordinates 122 (also not depicted for simplicity, but nonetheless understood to be present), the computing device 102 divides the communication devices 116 into a first subset of the communication devices 116-1 proximal the first egress point 110-1, a second subset of the communication devices 116-2 proximal the second egress point 110-2, and a third subset of the communication devices 116-3 proximal the third egress point 110-3. While such a division is understood to occur electronically at the computing device 102, for simplicity the different subsets are indicated at the location 106 separated by broken lines therebetween. For further clarity, sets of the persons 118-1, 118-2, 118-3 respectively associated with the subset of the communication devices 116-1, 116-2, 116-3 are also indicated at the location 106.

While not depicted, the computing device 102 may generate and store lists of identifiers of the communication devices 116 in each of the subsets thereof, such that such identifiers may be used to transmit generated tokens to the subsets using the identifiers. In some examples, such identifiers may include identifiers that enable the computing device 102 to transmit tokens to the communication devices 116 via the respective applications 120.

FIG. 4 further depicts the computing device 102 generating respective tokens 402-1, 402-2, 402-3 (e.g., the tokens 402 and/or a token 402, and respectively labelled "Token (1)", "Token(2)", and "Token(3) at the computing device 102 in FIG. 1) for the subsets of the communication devices 116 that may be particular to the subsets.

For example, a first token 402-1 may be particular to the first subset of the communication devices 116-1, such that when the first token 402-1 is later received at the computing device 102, the computing device 102 may identify the first token 402-1 as being received from a communication device 116-1 in the first subset.

Similarly, a second token 402-2 may be particular to the second subset of the communication devices 116-2, such that when the second token 402-2 is later received at the computing device 102, the computing device 102 may identify the second token 402-2 as being received from a communication device 116-2 in the second subset.

Similarly, a third token 402-3 may be particular to the third subset of the communication devices 116-3, such that when the third token 402-3 is later received at the computing device 102, the computing device 102 may identify the third token 402-3 as being received from a communication device 116-3 in the third subset.

The tokens 402-1, 402-2, 402-3 further comprise indications of respective routes 404-1, 404-2, 404-3 (e.g., the routes 404 and/or a route 404, and respectively labelled "Route(1)", "Route(2)", and "Route(3) at the computing device 102 in FIG. 1)), that may be provided to a communication device 116 that receives a token 402 to indicate an evacuation route from the location 106 to a respective geographic location 108. While not depicted, it is understood that the routes 404 may be determined as described herein, and may be further based on current weather conditions and/or traffic conditions, amongst other possibilities, assuming the computing device 102 has access to such information (e.g., via a weather server, a traffic server, and the like, not depicted).

As depicted, the computing device 102 transmits (e.g., at the block 302 of the method 300), the tokens 402 to the respective subsets of the communication devices 116, such that the first set of the communication devices 116-1 receive the first token 402-1, the second set of the communication devices 116-2 receive the second token 402-2, and the third set of the communication devices 116-3 receive the third token 402-3. While for simplicity the respective tokens 402 are depicted at only one respective communication device 116 of each subset, they are nonetheless understood to be received at all respective communication devices 116 of each subset. Similarly, while for simplicity the indications of the routes 404 are not depicted at the transmitted tokens 402, they are nonetheless understood to be present and, when received, may be displayed at display screen of the communication devices 116

As depicted, the computing device 102 may also transmit commands 406 to the egress points 110. For example, attention is next directed to FIG. 5, which graphically depicts the respective routes 404-1, 404-2, 404-4 from the location 106 to the respective geographic locations 108. In particular, a first route 404-1 is through the first egress point 110-1 to the first geographic location 108-1, a second route 404-2 is through the second egress point 110-2 to the second geographic location 108-2, and a third route 404-3 is through the third egress point 110-3 to the third geographic location 108-3.

Figure 5:
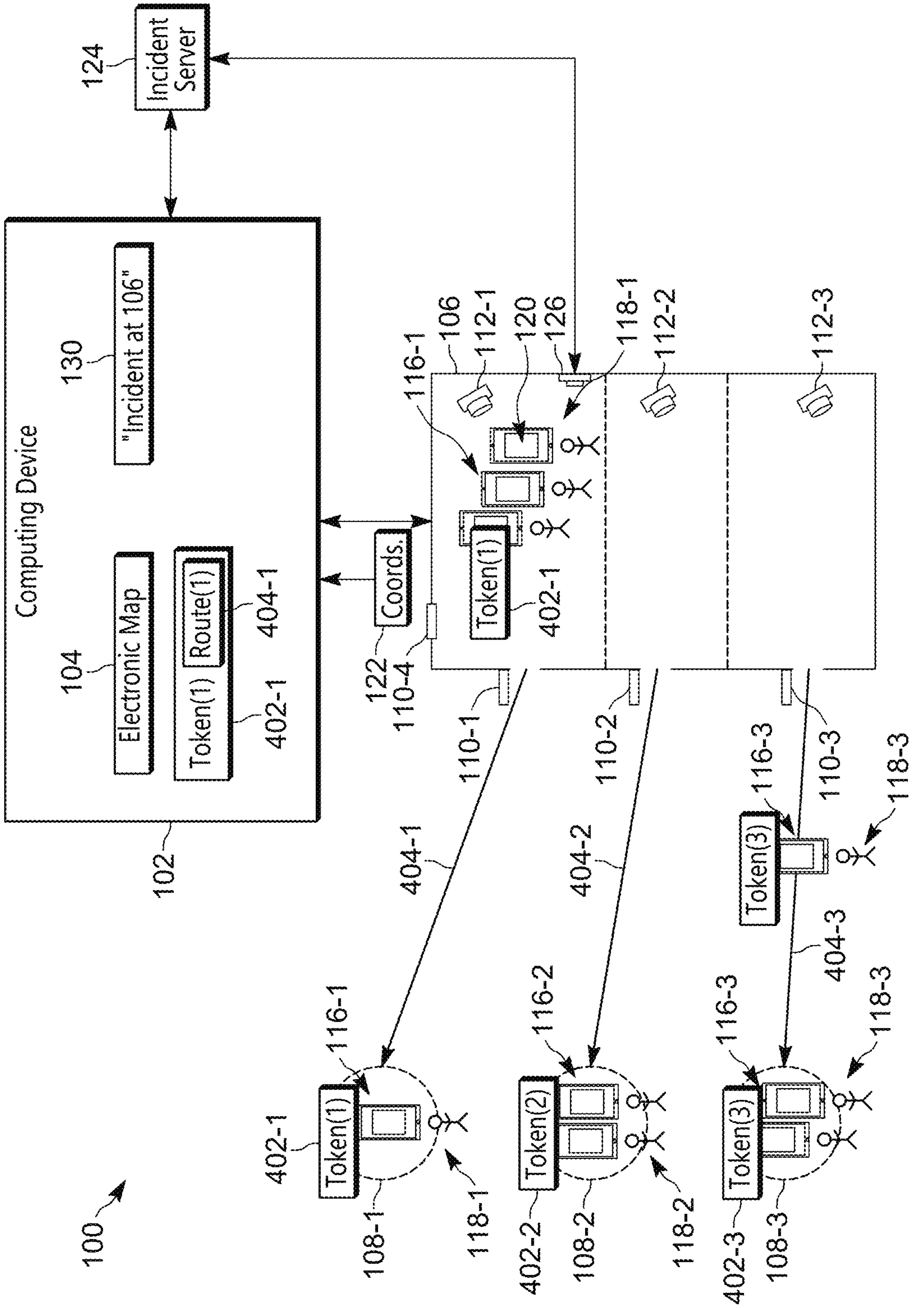
FIG. 5 depicts the system of FIG. 1 continuing to implement a method for using modified tokens to control communication device movement, in accordance with some examples.

As such, the commands 406 are understood to instruct the egress points 110-1, 110-2, 110-3 to open (and/or unlock), as depicted in FIG. 5.

Furthermore, each route 404 represents a most direct route to respective geographic locations 108 for each of the respective subsets of the communication devices 116.

As further depicted in FIG. 5, it is understood that some of the communication devices 116 have been carried by respective persons 118 to respective geographic locations 108, depending on which indication of a route 404 was provided with a respective token 402.

For example, all of the communication devices 116-2 of the second subset has been carried by respective persons 118-2 to the second geographic location 108-2, and two of the communication devices 116-3 of the third subset has been carried by respective persons 118-3 to the third geographic location 108-3, though a last one of the communication devices 116-3 of the third subset is still being carried along the third route 404-3 to the third geographic location 108-3.

However, in contrast, only one of the communication devices 116-1 of the first subset has been carried by a respective person 118-1 to the geographic location 108-1. The remaining communication devices 116-1 of the first subset remain at the location 106 and, as depicted, may optionally continue to transmit their respective coordinates 122 to the computing device 102 such that the computing device 102 may determine that the remaining communication devices 116-1 of the first subset remain at the location 106.

While the other communication devices 116 may also continue to transmit their respective coordinates 122 to the computing device 102, such transmission may not occur to save bandwidth in the system 100 as has already been described.

Figure 6:
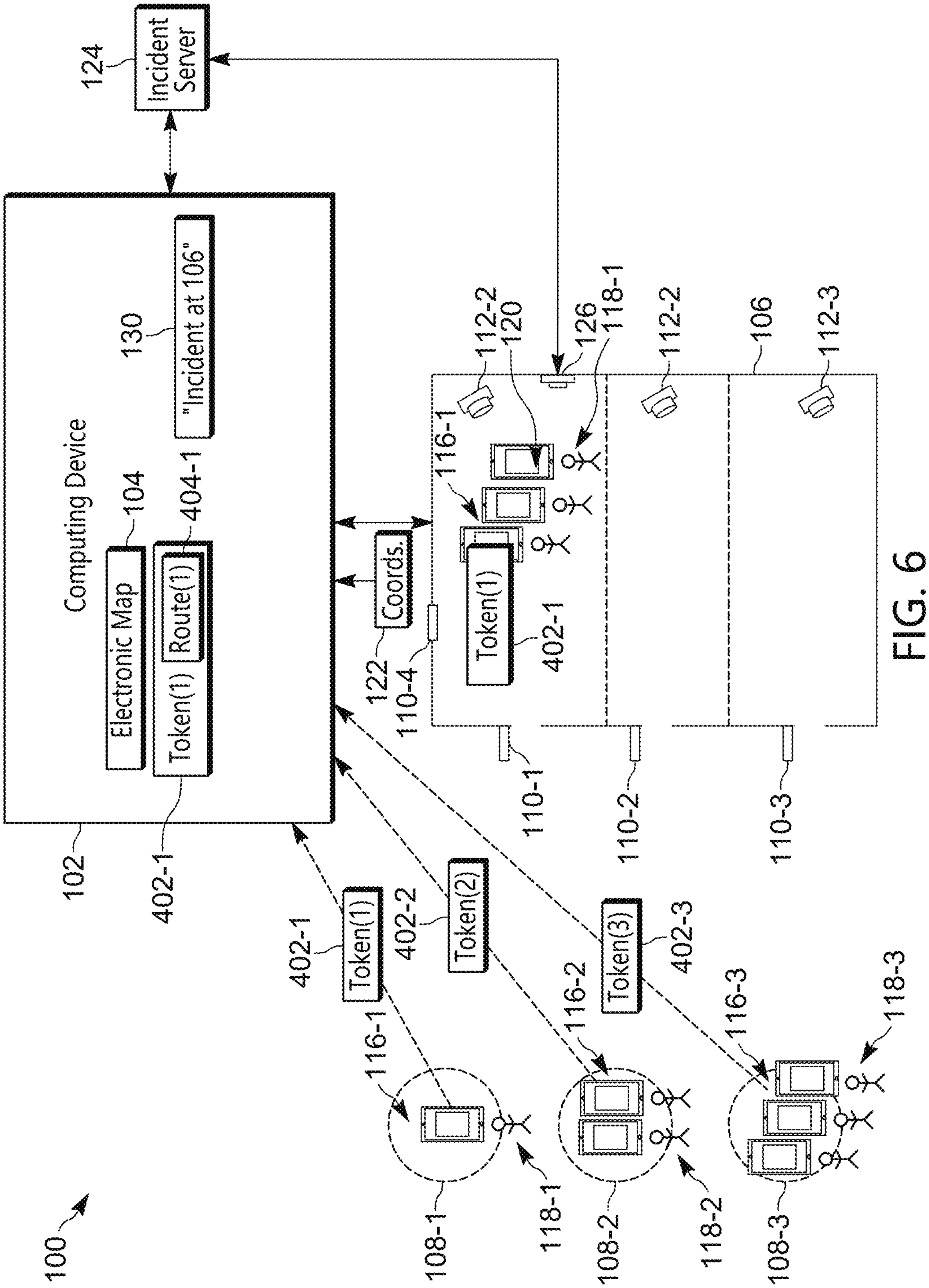
FIG. 6 depicts the system of FIG. 1 continuing to implement a method for using modified tokens to control communication device movement, in accordance with some examples.

Attention is next directed to FIG. 6, which depicts the communication devices 116 that have arrived at the respective geographic locations 108, including the last of the communication devices 116-3 of the third subset arriving at the third geographic location 108-3, transmitting their respective tokens 402-1, 402-2, 402-3 to the computing device 102, where the respective tokens 402 are received (e.g., at the block 304 of the method 300). As has been described, the respective tokens 402 transmitted to the computing device 102 may be in a same or different format as the corresponding tokens 402 provided to the communication devices 102, and may include actual routes used to reach the geographic locations 108.

The computing device 102 may determine that the respective tokens 402-2, 402-3 have been received from all the communication devices 116-2, 116-3 of the second and third subsets, and for such communication devices 116-2, 116-3 the method 300 may end. Put another way, the method 300 may occur in parallel for each subset of the communication devices 116.

Figure 7:
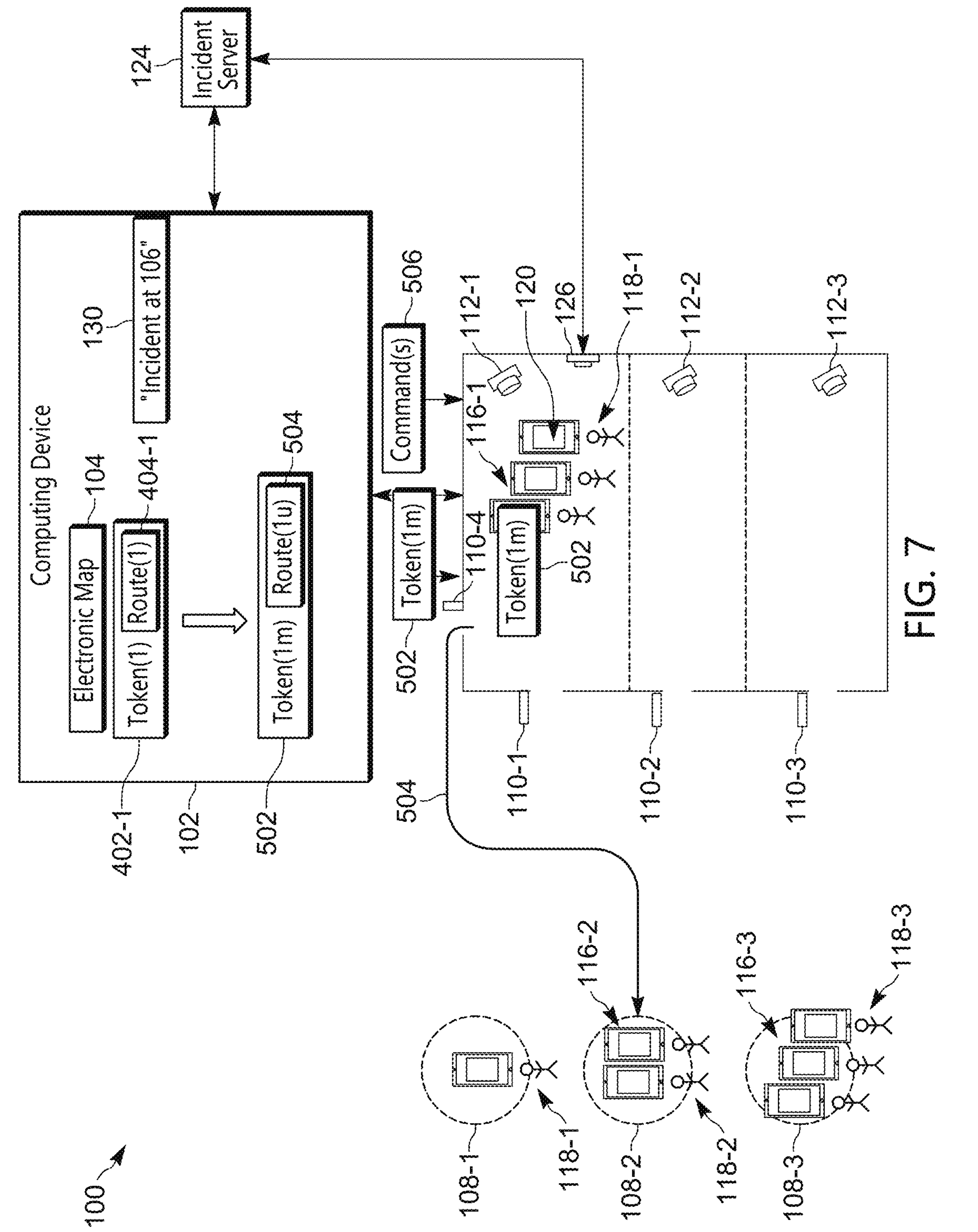
FIG. 7 depicts the system of FIG. 1 continuing to implement a method for using modified tokens to control communication device movement, in accordance with some examples.

However, the computing device 102 may determine that only one token 402-1 has received from the communication devices 116-1 of the first subset, and with reference to FIG. 7, proceed to modify (e.g., at the block 306 of the method 300) the first token 402-1 to a modified token 502 (e.g., labelled "Token(1m) in FIG. 7), that includes an indication (e.g., labelled "Route(1u)" in FIG. 7) of an updated route 504, as is next described.

In particular, as also depicted in FIG. 7, the updated route 504 modifies the first route 404-1 from being through the first egress point 110-1 to the first geographic location 108-1, to being through the fourth egress point 110-4 to the second geographic location 108-2. The modification of the first route 404-1 to the updated route 504 may occur as only one of the communication devices 116-1 of the first subset has arrived at the first geographic location 108-1 and transmitted a respective first token 402-1 back to the computing device 102, while all of the communication devices 116-2 of the second subset have arrived at the second geographic location 108-2 as indicated by receipt of the respective second tokens 402-2 at the computing device 102.

Such a scenario may indicate that the original first route 404-1 and/or the first geographic location 108-1 may not be suitable for use in the evacuation, and/or that the first egress point 110-1 may be partially blocked, and hence the updated route 504 may avoid use of the first egress point 110-1 and may avoid use the first geographic location 108-1. The updated route 504 may, in some examples, be based on one or more actual routes used to reach the first geographic location 108-1 and/or the second geographic location 108-2 as may be respectively provided with the returned tokens 402-1, 402-2.

As depicted, the computing device 102 transmits (e.g., at the block 308 of the method 300) the modified token 502 (e.g., with the indication of the updated route 504), to the communication devices 116-1 of the first subset from which a respective electronic token 402-1 has not yet been received, which may cause the persons 118-1 to carry the communication devices 116-1 of the first subset that are still at the location 106 to carry their respective communication devices 116-1 through the fourth egress point 110-4 to the second geographic location 108-2. Put another way, the updated route 504 may be displayed at display screens of the communication devices 116-1 of the first subset from which a respective electronic token 402-1 has not yet been received, and a respective person 118-1 may follow the updated route 504, carrying their respective communication device 116-1 accordingly along the updated route 504.

However, in scenarios where one or more of the communication devices 116-1 of the first subset are not at the location 106, but have not yet arrived at the first geographic location 108-1, the modified token 502 (e.g., with the indication of the updated route 504) may also be transmitted to such communication devices 116-1 of the first subset, and displayed at display screens of such communication devices 116-1, and a respective person 118-1 may change course and follow the updated route 504, carrying their respective communication device 116-1 accordingly along the updated route 504.

Further, as depicted, the computing device 102 transmits a command 506 to open the fourth egress point 110-4 to facilitate following of the updated route 504. Also as depicted, the other egress points 110 remain open, which may assist first responders in responding the incident at the location 106.

Furthermore, while only one updated route 504 is depicted, more than one update route 504 may be determined, for example to direct one portion of the communication devices 116-1 of the first subset along the depicted route 504, and other communication devices 116-1 of the first subset along another updated route 504, such as through the second egress point 110-2 to the second geographic location 108-2, or the third geographic location 108-3. When more than one updated route 504 is determined, associated respective modified tokens 502 are generated and provided to different portions of the communication devices 116-1 of the first subset from which tokens 402-1 have not yet been received. Put another way, the communication devices 116-1 of the first subset from which tokens 402-1 have not yet been received may be divided into different further subsets (e.g., different portions) as described herein and modified tokens 502, and associated updated routes 504 generated and transmitted accordingly.

Indeed, the method 300 may be repeated until all the communication devices 116 have reached a geographic location 108.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic tokens cannot reduce bandwidth usage, cannot train a machine learning algorithm, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions and/or program code (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions and/or program code, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

transmitting, from a computing device, to subsets of a plurality of communication devices at a given location, respective electronic tokens that indicate respective routes from the given location to one or more respective geographic locations, wherein each electronic token corresponds to a respective communication device and comprises geofence coordinates of the respective geographic location indicated by the respective route;

receiving, at the computing device, the respective electronic tokens returned, as received by the respective communication devices, from respective communication devices, wherein each returned electronic token is the corresponding one of the electronic tokens previously transmitted to the respective communication device, wherein each returned electronic token is returned in response to the respective communication device determining, using the geofence coordinates included in the corresponding electronic token, that the respective communication device has reached the respective geographic location, wherein receipt of each returned electronic token indicates that the respective communication device has arrived at the respective geographic location;

after waiting, by the computing device, for a given time period selected based on one or more estimated times for the communication devices of a respective subset of the subsets to reach the one or more respective geographic locations via the respective routes, determining that a number of the respective electronic tokens returned from the communication devices of the respective subset is below a threshold number indicative of a percentage of an original number of the communication devices in the respective subset to which the electronic tokens were transmitted;

in response to the determining, modifying the respective electronic tokens for one or more communication devices of the respective subset from which a respective electronic token has not yet been returned;

transmitting, from the computing device, to the one or more communication devices of the respective subset from which a respective electronic token has not yet been returned and that are remaining at the given location, respective modified electronic tokens, the respective modified electronic tokens indicating one or more respective updated routes from the given location to the one or more respective geographic locations; and one or more of unlocking one or more egress points from the given location to the one or more respective geographic locations along the respective routes; and unlocking one or more respective egress points from the given location to the one or more respective geographic locations along the one or more respective updated routes.

2. The method of claim 1, wherein at least one respective updated route of the respective updated routes is different from the respective routes.

3. The method of claim 1, wherein at least one geographic location associated with the respective updated routes is different from geographic locations associated with the respective routes.

4. The method of claim 1, further comprising:

one or more of: receiving, from one or more cameras located at the given location, images of the given location; and receiving, from the plurality of communication devices, respective location coordinates of the plurality of communication devices within the given location; and dividing the plurality of communication devices into the subsets based on one or more of the images and the respective location coordinates.

5. The method of claim 1, further comprising:

receiving, from one or more cameras located at the given location, images of the given location;

analyzing the images to determine one or more of a crowd size and a crowd density; and initiating transmission of the respective electronic tokens when the crowd size reaches a threshold crowd size or when the crowd density reaches a threshold crowd density.

6. The method of claim 1, further comprising:

receiving, from the plurality of communication devices, respective location coordinates;

analyzing the respective location coordinates to determine one or more of a crowd size and a crowd density; and initiating transmission of the respective electronic tokens when the crowd size reaches a threshold crowd size or when the crowd density reaches a threshold crowd density.

7. The method of claim 1, further comprising:

receiving, from an incident server, an indication of an incident occurring in proximity to the given location; and initiating transmission of the respective electronic tokens in response to receiving the indication of the incident.

8. The method of claim 1, wherein after leaving the given location and before returning the respective electronic tokens, the respective communication devices do not transmit respective location coordinates to the computing device.

9. The method of claim 1, wherein the respective electronic tokens and the respective modified electronic tokens are transmitted to the communication devices via an application installed at the communication devices.

10. A computing device comprising:

a controller communicatively coupled to one or more of a microphone and a camera; and a computer-readable storage medium having stored thereon program instructions that, when executed by the controller, causes the controller to perform a set of operations comprising:

transmitting, to subsets of a plurality of communication devices at a given location, respective electronic tokens that indicate respective routes from the given location to one or more respective geographic locations, wherein each electronic token corresponds to a respective communication device and comprises geofence coordinates of the respective geographic location indicated by the respective route;

receiving the respective electronic tokens returned, as received by the respective communication devices, from respective communication devices, wherein each returned electronic token is the corresponding one of the electronic tokens previously transmitted to the respective communication device, wherein each returned electronic token is returned in response to the respective communication device determining, using the geofence coordinates included in the corresponding electronic token, that the respective communication device has reached the respective geographic location, wherein receipt of each returned electronic token indicates that the respective communication device has arrived at the respective geographic location;

after waiting, by the controller, for a given time period selected based on one or more estimated times for the communication devices of a respective subset of the subsets to reach the one or more respective geographic locations via the respective routes, determining that a number of the respective electronic tokens returned from the communication devices of the respective subset is below a threshold number indicative of a percentage of an original number of the communication devices in the respective subset to which the electronic tokens were transmitted;

in response to the determining, modifying the respective electronic tokens for one or more communication devices of the respective subset from which a respective electronic token has not yet been returned;

transmitting, to the one or more communication devices of the respective subset from which a respective electronic token has not yet been returned and that are remaining at the given location, respective modified electronic tokens, the respective modified electronic tokens indicating one or more respective updated routes from the given location to the one or more respective geographic locations; and one or more of:

unlocking one or more egress points from the given location to the one or more respective geographic locations along the respective routes; and unlocking one or more respective egress points from the given location to the one or more respective geographic locations along the one or more respective updated routes.

11. The computing device of claim 10, wherein at least one respective updated route of the respective updated routes is different from the respective routes.

12. The computing device of claim 10, wherein at least one geographic location associated with the respective updated routes is different from geographic locations associated with the respective routes.

13. The computing device of claim 10, wherein the set of operations further comprises:

one or more of: receiving, from one or more cameras located at the given location, images of the given location; and receiving, from the plurality of communication devices, respective location coordinates of the plurality of communication devices within the given location; and dividing the plurality of communication devices into the subsets based on one or more of the images and the respective location coordinates.

14. The computing device of claim 10, wherein the set of operations further comprises:

receiving, from one or more cameras located at the given location, images of the given location;

analyzing the images to determine one or more of a crowd size and a crowd density; and initiating transmission of the respective electronic tokens when the crowd size reaches a threshold crowd size or when the crowd density reaches a threshold crowd density.

15. The computing device of claim 10, wherein the set of operations further comprises:

receiving, from the plurality of communication devices, respective location coordinates;

analyzing the respective location coordinates to determine one or more of a crowd size and a crowd density; and initiating transmission of the respective electronic tokens when the crowd size reaches a threshold crowd size or when the crowd density reaches a threshold crowd density.

16. The computing device of claim 10, wherein after leaving the given location and before returning the respective electronic tokens, the respective communication devices do not transmit respective location coordinates to the computing device.

* * * * *